United States Patent
Santhosh et al.

(10) Patent No.: US 12,427,507 B2
(45) Date of Patent: Sep. 30, 2025

(54) REFORMING CATALYST AND A METHOD OF MODIFICATION AND APPLICATION THEREOF

(71) Applicant: HINDUSTAN PETROLEUM CORPORATION LIMITED, Karnataka (IN)

(72) Inventors: Kotni Santhosh, Bangalore (IN); Sandiri Santhoshkumar Reddy, Bangalore (IN); Bennet Chelliahn, Bangalore (IN); Bojja Ramachandrarao, Bangalore (IN); Valavarasu Gnanasekaran, Bangalore (IN)

(73) Assignee: HINDUSTAN PETROLEUM CORPORATION LIMITED (IN)

( * ) Notice: Subject to any disclaimer, the term of this patent is extended or adjusted under 35 U.S.C. 154(b) by 330 days.

(21) Appl. No.: 17/761,160

(22) PCT Filed: Jul. 23, 2020

(86) PCT No.: PCT/IN2020/050637
§ 371 (c)(1),
(2) Date: Mar. 16, 2022

(87) PCT Pub. No.: WO2021/161327
PCT Pub. Date: Aug. 19, 2021

(65) Prior Publication Data
US 2023/0347329 A1    Nov. 2, 2023

(30) Foreign Application Priority Data

Feb. 13, 2020 (IN) .............................. 202041006372

(51) Int. Cl.
| | | |
|---|---|---|
| *B01J 33/00* | (2006.01) |
| *B01J 6/00* | (2006.01) |
| *B01J 20/32* | (2006.01) |
| *B01J 27/13* | (2006.01) |
| *B01J 27/135* | (2006.01) |
| *B01J 35/00* | (2024.01) |
| *B01J 35/10* | (2006.01) |
| *B01J 35/60* | (2024.01) |
| *B01J 37/02* | (2006.01) |

(52) U.S. Cl.
CPC .............. *B01J 33/00* (2013.01); *B01J 6/001* (2013.01); *B01J 20/3204* (2013.01); *B01J 27/13* (2013.01); *B01J 27/135* (2013.01); *B01J 35/19* (2024.01); *B01J 35/60* (2024.01); *B01J 37/0209* (2013.01); *B01J 37/0219* (2013.01); *B01J 37/0236* (2013.01)

(58) Field of Classification Search
CPC ... B01J 33/00; B01J 35/19; B01J 35/60; B01J 37/0209; B01J 37/0219; B01J 37/0236; B01J 27/13; B01J 27/135; B01J 6/001
See application file for complete search history.

(56) References Cited

U.S. PATENT DOCUMENTS

| | | | |
|---|---|---|---|
| 4,159,257 A | 6/1979 | Engelhard et al. | |
| 6,045,689 A | 4/2000 | Alario et al. | |
| 6,218,334 B1 * | 4/2001 | Alario .................... | C10G 35/09 502/227 |
| 2002/0107139 A1 | 8/2002 | Degnan et al. | |
| 2003/0136708 A1 * | 7/2003 | Crane ..................... | B01J 21/04 208/138 |
| 2004/0014600 A1 | 1/2004 | Fukunaga | |
| 2007/0041895 A1 | 2/2007 | Fukunaga | |
| 2017/0106352 A1 * | 4/2017 | Sharma .................. | B01J 35/394 |

FOREIGN PATENT DOCUMENTS

| | | | |
|---|---|---|---|
| CN | 102441377 A | | 5/2012 |
| EP | 1093852 A1 | | 4/2001 |
| GB | 1 525 554 A | | 9/1978 |
| RU | 2 157 826 C2 | | 10/2000 |
| WO | 0238268 A1 | | 5/2002 |
| WO | 2007137028 A2 | | 11/2007 |

OTHER PUBLICATIONS

Shamsi et al., Applied Catalysis A: General, (2005), v.293, p. 145-152.*
Zarezadeh-Mehrizi et al., Scientia Iranica, (2019), 26(3), p. 1555-1565.*
IN Examination Report in Application No. 202041006372 Dated Sep. 14, 2022.
RU Office Action dated Mar. 3, 2023 as received in Application No. 2022106965.
CN Office Action dated Nov. 25, 2023 as received in Application No. 202080069114.5.

* cited by examiner

*Primary Examiner* — Yong L Chu

(57) ABSTRACT

The present disclosure provides a process for preparing a reforming catalyst, said process comprising: (a) impregnating at least one support with at least one promoter metal and at least one active metallic component to obtain a second catalytic precursor; (b) contacting the second catalytic precursor with at least one non-metallic component to obtain a third catalytic precursor; (c) coating the third catalytic precursor with at least one silanizing agent to obtain a coated third catalytic precursor; and (d) drying the coated third catalytic precursor to obtain a dried third catalytic precursor followed by calcination of the dried third catalytic precursor to obtain the reforming catalyst. The present disclosure also provides a reforming catalyst and the process for catalytically reforming a hydrocarbon feed stream by using the reforming catalyst.

12 Claims, 1 Drawing Sheet

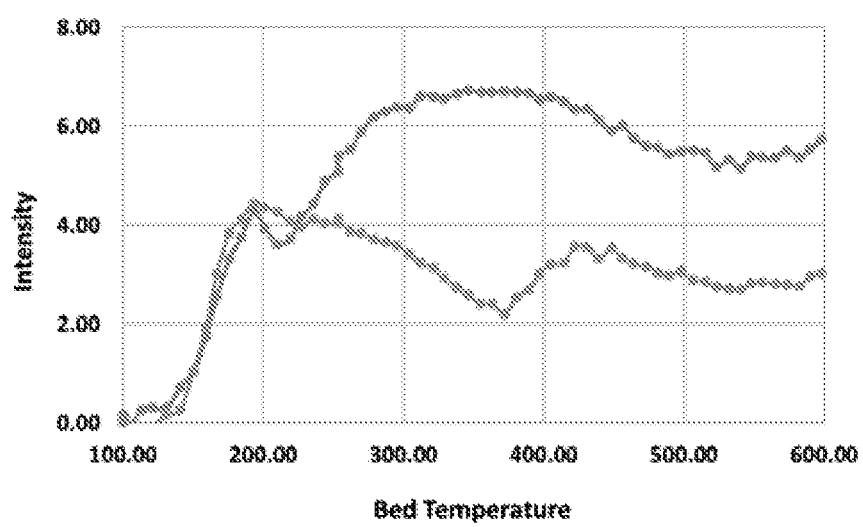

REFORMING CATALYST AND A METHOD OF MODIFICATION AND APPLICATION THEREOF

FIELD OF INVENTION

The present disclosure relates to the field of catalysts. In particular, the present disclosure relates to a process for preparing a reforming catalyst which improves the catalytic activity of the reforming catalyst.

BACKGROUND OF THE INVENTION

Catalytic reforming is an important process in the petroleum and petrochemical industries for the production of high octane gasoline. Catalytic naphtha reforming is a process that converts low-value naphthas into high-octane reformate products for gasoline blending and into high-value aromatics for petrochemical processing. In the reforming process, naphthas rich in paraffins and naphthenes are converted mainly to aromatic hydrocarbons by contacting with a catalyst at elevated temperatures and pressures.

The catalytic reforming process has been carried out in different ways which include semi-regenerative catalytic reformer process, cyclic regenerative catalytic reformer process, and continuous catalytic regeneration reformer process. All of these processes involve the use of catalysts for efficient conversion of low-octane gasoline to high-octane gasoline. The catalysts used must convert paraffins and naphthenes to aromatics with as little ring-opening or cracking as possible.

There has been a continuous effort in obtaining catalyst which can efficiently catalyze all the reactions in the conversion process. The patent document EP1093852A1 discloses an auto-thermal reforming catalyst comprising zirconia and ruthenium. US20070041895A1 discloses the catalyst comprising an alumina carrier containing cerium oxide and a platinum group element carried by the alumina carrier.

While many improvements have been made to the reforming catalyst in the recent years, however, there still exists a need in the art to further improve the activity, acid function of the catalyst so as to reduce the cost involved during the reforming procedures.

SUMMARY OF THE INVENTION

In an aspect of the present disclosure, there is provided a process for preparing a reforming catalyst, said process comprising: (a) impregnating at least one support with at least one promoter metal and at least one active metallic component to obtain a second catalytic precursor; (b) contacting the second catalytic precursor with at least one non-metallic component to obtain a third catalytic precursor; (c) coating the third catalytic precursor with at least one silanizing agent to obtain a coated third catalytic precursor; and (d) drying the coated third catalytic precursor to obtain a dried third catalytic precursor followed by calcination of the dried third catalytic precursor to obtain the reforming catalyst.

In a second aspect of the present disclosure, there is provided a reforming catalyst prepared from the process, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst.

In a third aspect of the present disclosure, there is provided a reforming catalyst comprising at least one support selected from a group consisting of alpha-aluminium oxide, beta-aluminium oxide, gamma-aluminium oxide, delta-aluminium oxide, theta-aluminium oxide, $SiO_2$, silica-alumina (SIRALs), titania, zirconia, zinc oxide, composites of alumina and zeolites, spinel structures, and combinations thereof, having a weight percentage in a range of 83-98% with respect to the reforming catalyst, at least one promoter metal selected from a group consisting of tin, rhenium, germanium, iridium, thallium, lead, indium, and combinations thereof, having a weight percentage in a range of 0.05-1% with respect to the reforming catalyst, and at least one active metallic component is selected from a group consisting of platinum, palladium, ruthenium, rhodium, osmium, iridium, and combinations thereof having a weight percentage in a range of 0.05-1% with respect to the reforming catalyst, and at least one non-metallic component selected from a group consisting of chlorine, fluorine, bromine, aqueous HCl, perchloroethylene, and combinations thereof having a weight percentage in a range of 0.6-10% with respect to the reforming catalyst, and a layer of silica oxide having a weight percentage in a range of 0.5-5.0% with respect to the reforming catalyst.

In a fourth aspect of the present disclosure, there is a process for catalytically reforming a hydrocarbon feed stream, said process comprising: contacting the hydrocarbon feed stream with the reforming catalyst as disclosed herein to obtain a reformed hydrocarbon stream.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the FIGURES, the left-most digit (s) of a reference number identifies the FIG. in which the reference number first appears. The same numbers are used throughout the drawings to reference like features and components.

FIG. 1 depicts the acidity profile of the catalyst with silica coating and without silica coating, in accordance with an implementation of the present subject matter.

DETAILED DESCRIPTION OF THE INVENTION

Those skilled in the art will be aware that the present disclosure is subject to variations and modifications other than those specifically described. It is to be understood that the present disclosure includes all such variations and modifications. The disclosure also includes all such steps, features, compositions, and compounds referred to or indicated in this specification, individually or collectively, and any and all combinations of any or more of such steps or features.

Definitions

For convenience, before further description of the present disclosure, certain terms employed in the specification, and examples are delineated here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature in the range of about 40-120° C. should be interpreted to include not only the explicitly recited limits of about 40° C. to about 120° C. but also to include sub-ranges, such as 41-119° C., 60-100° C. and so forth, as well as individual amounts, including fractional amounts, within the specified ranges, such as 60° C., and 115.5° C. for example.

The term "at least one" is used to mean one or more and thus includes individual components as well as mixtures/combinations.

For the purposes of the present disclosure, the term "catalytic reforming" refers to a chemical process used to convert petroleum refinery naphtha distilled from crude oil into high-octane liquid products called reformates, which are premium blending stocks for high-octane gasoline as well as petrochemical feedstock.

For the purposes of the present disclosure, the term "reforming catalyst" refers to a catalyst used for the process of continuous catalytic reforming.

For the purposes of the present disclosure, the term "promoter" refers to a substance added to a catalyst to improve the catalytic performance; the term "support" refers to catalyst support which means a solid with high surface area with required porosity to which the active metal and promoter is fixed/supported; the term "silanizing agent" refers to chemical entity which can cover a surface with organofunctional alkoxysilane molecules or orthosilicates or a combination thereof. In the present disclosure, the silanizing agent modifies the surface of the support by $SiO_2$ layering and this process of surface modification is referred to as "silanization".

The terms such as "first catalytic precursor" refers to the catalytic precursor comprising promoter atom loaded on to the support that requires further activation to produce the active catalyst, "second catalytic precursor" refers to the catalytic precursor comprising active atom on to the promoter loaded support, "third catalytic precursor" refers to the catalytic precursor comprising non-metallic component included in the metals loaded support; "coated third catalytic precursor" refers to the catalytic precursor coated with a silanizing agent; "dried third catalytic precursor" refers to the catalytic precursor obtained by drying the third catalytic precursor.

The term "impregnating" refers to adding a metal-containing solution to the support. In the present disclosure, the terms "impregnating", "impregnation", and "depositing" can be used interchangeably herein. The step of impregnation is done by means of wet impregnation.

For the purpose of the present disclosure, the term "RON value" refers to the Research Octane Number which refers to a standard measure of the performance of an engine with respect to the anti-knock quality or resistance to pre-ignition. Research Octane number of the fuels are obtained from test engines with a variable compression ratio under controlled conditions and comparing the results with those for mixtures of iso-octane and n-heptane.

As disclosed herein, the term "sinter resistance" refers to a process of protecting the metals from getting agglomerated during the high temperature reforming reactions. In the present disclosure, the coating of the silanizing agent on the catalyst helps to provide a protective shell cover on the metals supports on the catalyst (third catalytic precursor).

The term "Loss on Ignition (LOI)" is a process of heat treatment of the materials to know about mass loss).

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The present disclosure is not to be limited in scope by the specific embodiments described herein, which are intended for the purposes of exemplification only. Functionally-equivalent products, compositions, and methods are clearly within the scope of the disclosure, as described herein.

As discussed in the background section, the reforming catalysts that are available in the art have various limitations that include elevated acid cracking, loss of catalytic activity and selectivity of the catalyst during the reforming reactions. To overcome the aforementioned problems, the present disclosure provides a convenient process for obtaining the reforming catalyst by impregnation of active metal and promoter metal on solid support followed by silanization of the metal/promoter impregnated support. In particular, the silanization process improves the acidic character of the support and also helps to improve the sinter resistance behavior of the active metal, thereby, providing protecting the metals from aggregation during the high temperature reforming reactions. Overall, the present disclosure helps to enhance the catalytic performance of the reforming catalyst.

In an embodiment of the present disclosure, there is provided a process for preparing a reforming catalyst, said process comprising: (a) impregnating at least one support with at least one promoter metal and at least one active metallic component to obtain a second catalytic precursor; (b) contacting the second catalytic precursor with at least one non-metallic component to obtain a third catalytic precursor; (c) coating the third catalytic precursor with at least one silanizing agent to obtain a coated third catalytic precursor; and (d) drying the coated third catalytic precursor to obtain a dried third catalytic precursor followed by calcination of the dried third catalytic precursor to obtain the reforming catalyst.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst, wherein the at least one support is selected from a group consisting of alpha-aluminium oxide, beta-aluminium oxide, gamma-aluminium oxide, delta-aluminium oxide, theta-aluminium oxide, $SiO_2$, silica-alumina (SIRALs), titania, zirconia, zinc oxide, composites of alumina and zeolites, spinel structures, and combinations thereof. In another embodiment of the present disclosure, the at least one support is selected from a group consisting of alpha-aluminium oxide, beta-aluminium oxide, gamma-aluminium oxide, delta-aluminium oxide, theta-aluminium oxide, $SiO_2$, and combinations thereof. In yet another embodiment of the present disclosure, the at least one support is selected from a group consisting of gamma-aluminium oxide, $SiO_2$, and combinations thereof.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst, wherein the at least one promoter metal is selected from a group consisting of tin, rhenium, germanium, iridium, thallium, lead, indium, and combinations thereof. In another embodiment of the present disclosure, the at least one promoter metal is tin.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst, wherein the at least one active metallic component is selected from a group consisting of platinum, palladium, ruthenium, rhodium, osmium, iridium, and combinations thereof. In another embodiment of the present disclosure, the at least one active metallic component is platinum.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst, wherein the at least one non-metallic component is selected from a group consisting of chlorine, fluorine, bromine, aqueous HCl, perchloroethylene, and combinations thereof. In another embodiment of the present disclosure, the at least one non-metallic component is selected from a group consisting of chlorine, aqueous HCl, perchloroethylene, and combinations thereof. In yet another embodiment of the present disclosure, the at least one non-metallic component is chlorine, aqueous HCl.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst, wherein the at least one silanizing agent is selected from a group consisting of tetramethyl orthosilicate, tetraethyl orthosilicate, tetrapropyl orthosilicate, 3-aminopropyltrimethoxysilane, 3-aminopropyltriethoxysilane, 3-aminopropyltrimethoxysilane, and combinations thereof. In another embodiment of the present disclosure, the at least one silanizing agent is selected from a group consisting of tetramethyl orthosilicate, tetraethyl orthosilicate, tetrapropyl orthosilicate, and combinations thereof. In yet another embodiment of the present disclosure, the at least one silanizing agent is tetraethyl orthosilicate.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst, wherein the at least one support is selected from a group consisting of alpha-aluminium oxide, beta-aluminium oxide, gamma-aluminium oxide, delta-aluminium oxide, theta-aluminium oxide, $SiO_2$, silica-alumina (SIRALs), titania, zirconia, zinc oxide, composites of alumina and zeolites, spinel structures, and combinations thereof and wherein the at least one support has a porosity in a range of 2-20 nm. In yet another embodiment of the present disclosure, the at least one support has a porosity in a range of 8-19 nm. In yet another embodiment of the present disclosure, the at least one support has a porosity in a range of 10-16 nm.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst, wherein the at least one support is selected from a group consisting of alpha-aluminium oxide, beta-aluminium oxide, gamma-aluminium oxide, delta-aluminium oxide, theta-aluminium oxide, $SiO_2$, silica-alumina (SIRALs), titania, zirconia, zinc oxide, composites of alumina and zeolites, spinel structures, and combinations thereof, and wherein the at least one support has a surface area in a range of 150-250 $m^2/g$. In another embodiment of the present disclosure, the at least one support has a surface area in a range of 160-230 $m^2/g$. In yet another embodiment of the present disclosure, the at least one support has a surface area in a range of 180-200 $m^2/g$.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst, wherein the at least one support is selected from a group consisting of alpha-aluminium oxide, beta-aluminium oxide, gamma-aluminium oxide, delta-aluminium oxide, theta-aluminium oxide, $SiO_2$, silica-alumina (SIRALs), titania, zirconia, zinc oxide, composites of alumina and zeolites, spinel structures, and combinations thereof, and wherein the at least one support has a pore volume in a range of 0.5-1.0 cc/gm. In another embodiment of the present disclosure, the at least one support has a pore volume in a range of 0.6-0.8 cc/gm.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst, wherein the at least one support is selected from a group consisting of alpha-aluminium oxide, beta-aluminium oxide, gamma-aluminium oxide, delta-aluminium oxide, theta-aluminium oxide, $SiO_2$, silica-alumina (SIRALs), titania, zirconia, zinc oxide, composites of alumina and zeolites, spinel structures, and combinations thereof, and wherein the at least one support has a crushing strength in a range of 2-10 daN.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst, wherein the at least one support is selected from a group consisting of alpha-aluminium oxide, beta-aluminium oxide, gamma-aluminium oxide, delta-aluminium oxide, theta-aluminium oxide, $SiO_2$, silica-alumina (SIRALs), titania, zirconia, zinc oxide, composites of alumina and zeolites, spinel structures, and combinations thereof, wherein the at least one support has a sphere size in a range of 1.7-1.9 mm.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst, wherein the at least one support is selected from a group consisting of alpha-aluminium oxide, beta-aluminium oxide, gamma-aluminium oxide, delta-aluminium oxide, theta-aluminium oxide, $SiO_2$, silica-alumina (SIRALs), titania, zirconia, zinc oxide, composites of alumina and zeolites, spinel structures, and combinations thereof, and wherein the at least one support has an attrition loss in a range of 0.1-2.0%.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst, wherein the at least one support is selected from a group consisting of alpha-aluminium oxide, beta-aluminium oxide, gamma-aluminium oxide, delta-aluminium oxide, theta-aluminium oxide, $SiO_2$, silica-alumina (SIRALs), titania, zirconia, zinc oxide, composites of alumina and zeolites, spinel structures, and combinations thereof, wherein the at least one support has a LOI (Loss on Ignition) percentage in a range of 1-3%.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst, wherein the at least one support is selected from a group consisting of alpha-aluminium oxide, beta-aluminium oxide, gamma-aluminium oxide, delta-aluminium oxide, theta-aluminium oxide, $SiO_2$, silica-alumina (SIRALs), titania, zirconia, zinc oxide, composites of alumina and zeolites, spinel structures, and combinations thereof, wherein the at least one support has a density in a range of 0.5-0.7 g/cc.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst, wherein the at least one support is selected from a group consisting of alpha-aluminium oxide, beta-aluminium oxide, gamma-aluminium oxide, delta-aluminium oxide, theta-aluminium oxide, $SiO_2$, silica-alumina (SIRALs), titania, zirconia, zinc oxide, composites of alumina and zeolites, spinel structures, and combinations thereof, wherein the at least one support has an acidity in a range of 0.4-0.8 mmol/g.

In an embodiment of the present disclosure, there is provided a process for preparing a reforming catalyst, said process comprising: (a) impregnating at least one support with an aqueous solution comprising at least one promoter metal to obtain a first catalytic precursor, wherein the impregnating at least one support comprises: contacting the aqueous solution with pH range of 1-4 comprising at least one promoter metal to the support for a time period in a range of 40-120 minutes at a temperature in a range of 40-60° C. at a speed in a range of 100-150 rpm, followed by solvent evaporation and drying at a temperature in a range of 40-120° C., under a pressure range of 30-200 mbar for a time period 20-90 minutes to obtain the first catalytic precursor, and wherein the impregnating at least one support is either done through sequential or co-impregnation mode; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst. In another embodiment of the present disclosure, impregnating at least one support with an aqueous solution comprising at least one promoter metal to obtain a first catalytic precursor, wherein the impregnating at least one support comprises: contacting the aqueous solution with pH range of 1-2 comprising at least one promoter metal to the support for a time period in a range of 40-60 minutes at a temperature in a range of 40-60° C. at a speed in a range of 100-120 rpm, followed by solvent evaporation and drying at a temperature in a range of 40-60° C., under a pressure range of 30-200 mbar for a time period 20-60 minutes to obtain the first catalytic precursor.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor comprises: contacting the aqueous solution comprising at least one active metallic component to the first catalytic precursor for a time period in a range of 40-120 minutes at a temperature in a range of 40-60° C. at a speed in a range of 100-150 rpm, followed by solvent evaporation and drying at a temperature in a range of 40-120° C., under a pressure range of 30-200 mbar for a time period 20-90 minutes to obtain the second catalytic precursor, and wherein depositing at least one support is either done through sequential or co-impregnation mode; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst. In another embodiment of the present disclosure, depositing an aqueous solution comprising at least one active metallic component on the first catalytic precursor comprises: contacting the aqueous solution comprising at least one active metallic component to the first catalytic precursor for a time period in a range of 40-60 minutes at a temperature in a range of 40-60° C. at a speed in a range of 100-120 rpm, followed by solvent evaporation and drying at a temperature in a range of 40-60° C., under a pressure range of 30-200 mbar for a time period 20-60 minutes to obtain the second catalytic precursor.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor, wherein contacting the second catalytic precursor with at least one non-metallic component is carried out at a temperature in the range of 40-60° C. and under pressure of 30-200 mbar followed by drying at a temperature in a range of 60-120° C. for a time period 10-20 hours to obtain the third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor, wherein contacting the second catalytic precursor with at least one non-metallic component is carried out at a temperature in a range of 450-600° C. for a time period in a range of 1-8 hours under continuous flow of compressed air and nitrogen followed by drying at a temperature in a range of 60-120° C. for a time period 10-20 hours to obtain the third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst, wherein the third catalytic precursor is calcined prior to step (d).

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor, wherein contacting the second catalytic precursor with at least one non-metallic component is carried out at a temperature in a range of 450-600° C. for a time period in a range of 1-8 hours followed by drying at a temperature in a range of 60-120° C. for a time period 10-20 hours to obtain the third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor, wherein coating the third catalyst precursor with at least one silanizing agent is carried out at temperature in a range of 20-35° C., under a pressure in a range of 30-200 mbar for a time period in a range of 20-130 minutes to obtain the coated third catalytic precursor; and (e) drying the coated third catalytic precursor to obtain a dried third catalytic precursor followed by calcination of the dried third catalytic precursor to obtain the reforming catalyst. In another embodiment of the present disclosure, coating the third catalyst precursor with at least one silanizing agent is carried out at temperature in a range of 20-25° C., under a pressure in a range of 30-200 mbar for a time period in a range of 20-60 minutes to obtain the coated third catalytic precursor.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst, wherein drying the coated third catalytic precursor is carried out at a temperature in a range of 100-130° C. to obtain the dried third catalytic precursor followed by calcination of the dried third catalytic precursor carried out at a time period in a range of 3-7 hours at a temperature in a range of 400-600° C. to obtain the reforming catalyst. In another embodiment of the present disclosure, drying the coated third catalytic precursor is carried out at a temperature in a range of 100-120° C. to obtain the dried third catalytic precursor followed by calcination of the dried third catalytic precursor carried out at a time period in a range of 3-4 hours at a temperature in a range of 400-500° C. to obtain the reforming catalyst.

In an embodiment of the present disclosure, there is provided a process for preparing a reforming catalyst, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst, and wherein the at least one support is selected from a group consisting of alpha-aluminium oxide, beta-aluminium oxide, gamma-aluminium oxide, delta-aluminium oxide, theta-aluminium oxide, $SiO_2$, silica-alumina (SIRALs), titania, zirconia, zinc oxide, composites of alumina and zeolites, spinel structures, and combinations thereof and wherein the at least one promoter metal is selected from a group consisting of tin, rhenium, germanium, iridium, thallium, lead, indium, and combinations thereof and wherein the at least one active metallic component is selected from a group consisting of platinum, palladium, ruthenium, rhodium, osmium, iridium, and combinations thereof and wherein the at least one non-metallic component is selected from a group consisting of chlorine, fluorine, bromine, aqueous HCl, perchloroethylene and combinations thereof and wherein the at least one silanizing agent is selected from a group consisting of tetramethyl orthosilicate, tetraethyl orthosilicate, tetrapropyl orthosilicate, 3-aminopropyltrimethoxysilane, 3-aminopropyltriethoxysilane, amonopropyltripropoxy silane, and combinations thereof.

In an embodiment of the present disclosure, there is provided a reforming catalyst prepared from the process, said process comprising: (a) impregnating at least one support with an aqueous solution comprising at least one promoter metal to obtain a first catalytic precursor; (b) depositing an aqueous solution comprising at least one active metallic component on the first catalytic precursor to obtain a second catalytic precursor; (c) contacting the second catalytic precursor with at least one non-metallic component to obtain a third catalytic precursor; (d) coating the third catalytic precursor with at least one silanizing agent component to obtain a coated third catalytic precursor; and (e) drying the coated third catalytic precursor to obtain a dried third catalytic precursor followed by calcination of the dried third catalytic precursor to obtain the reforming catalyst.

In an embodiment of the present disclosure, there is provided a reforming catalyst comprising at least one support selected from a group consisting of alpha-aluminium oxide, beta-aluminium oxide, gamma-aluminium oxide, delta-aluminium oxide, theta-aluminium oxide, $SiO_2$, silica-alumina (SIRALs), titania, zirconia, zinc oxide, composites of alumina and zeolites, spinel structures, and combinations thereof, having a weight percentage in a range of 83-98% with respect to the reforming catalyst, at least one promoter metal selected from a group consisting of tin, rhenium, germanium, iridium, thallium, lead, indium, and combinations thereof, having a weight percentage in a range of 0.05-1% with respect to the reforming catalyst, and at least one active metallic component is selected from a group consisting of platinum, palladium, ruthenium, rhodium, osmium, iridium, and combinations thereof having a weight percentage in a range of 0.05-1% with respect to the reforming catalyst, and at least one non-metallic component selected from a group consisting of chlorine, fluorine, bromine, aqueous HCl, perchloroethylene, and combinations thereof having a weight percentage in a range of 0.6-10% with respect to the reforming catalyst, and a layer of silica oxide having a weight percentage in a range of 0.5-5% with respect to the reforming catalyst. In another embodiment of the present disclosure, the at least one support having a weight percentage in a range of 90-98% with respect to the reforming catalyst, the at least one promoter metal having a weight percentage in a range of 0.07-1% with respect to the reforming catalyst, the at least one active metallic component having a weight percentage in a range of 0.07-1% with respect to the reforming catalyst, and the at least one non-metallic component having a weight percentage in a range of 0.8-10 with respect to the reforming catalyst, and the layer of silica oxide having a weight percentage in a range of 1.0-3% with respect to the reforming catalyst.

In an embodiment of the present disclosure, there is provided a reforming catalyst as disclosed herein, wherein the catalyst comprises the at least one promoter metal to the at least one active metallic component mole ratio is in a range between 0.2:1-1.7:1. In another embodiment of the present disclosure, the at least one promoter metal to the at least one active metallic component mole ratio is in a range of 0.5:1-1.6:1.

In an embodiment of the present disclosure, there is provided a reforming catalyst as disclosed herein, wherein the catalyst further comprises at least one alkali, alkaline earth metal, at least one transition metal, at least one rare earth metal, and combinations thereof.

In an embodiment of the present disclosure, there is provided a reforming catalyst as disclosed herein, wherein the catalyst is monometallic, bimetallic, and trimetallic. In another embodiment of the present disclosure, the catalyst is bimetallic.

In an embodiment of the present disclosure, there is provided a process as disclosed herein, wherein the process is used for increasing the sinter resistance behavior of the at least one active metallic component.

In an embodiment of the present disclosure, there is provided a reforming catalyst as disclosed herein, wherein the catalyst is modified for controlling the acidic behavior of the catalyst.

In an embodiment of the present disclosure, there is provided a reforming catalyst as disclosed herein, wherein the layer of silica oxide has a thickness in a range of 1-2 nm.

Although the subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the spirit or scope of the present subject matter as defined.

EXAMPLES

The disclosure will now be illustrated with the working examples, which is intended to illustrate the working of disclosure and not intended to take restrictively to imply any limitations on the scope of the present disclosure. Unless defined otherwise, all technical and scientific terms used herein have the same meaning as commonly understood to one ordinary person skilled in the art to which this disclosure belongs. Although methods and materials similar or equivalent to those described herein can be used in the practice of the disclosed methods and compositions, the exemplary methods, devices, and materials are described herein. It is to be understood that this disclosure is not limited to particular methods, and experimental conditions described, as such methods and conditions may apply.

The forthcoming examples demonstrate a convenient preparation process wherein the sequence of addition of each component on to the support is essential in obtaining the reforming catalyst of desired characteristics. In particular, the process comprised impregnation of promoter metal onto the surface of the solid support, further deposition of the active metal component on to the solid support, followed by the inclusion of the non-metallic component. The impregnated solid support was then subjected to the silanization process using a silanizing agent. The catalyst surface was layered with $SiO_2$. Specifically, the examples explain how the silanization process is crucial for enhancing the catalyst activity by increasing the acid characteristics of the support, and how the silanization process provides a balance between acid and metal sites of the catalyst which plays a key role in obtaining a better reforming catalyst.

Example 1

Preparation of Reforming Catalyst

The process for preparing the reforming catalyst of the present disclosure broadly involves the following steps. Firstly, the promoter metal was impregnated on the solid support followed by further deposition of the active metal on to the support. The bimetallic impregnated solid support was then contacted with a non-metallic component followed by the silanization process. The silanization process was carried out using a silanizing agent. In every preparation process explained above, the drying of the support and calcination whenever required was done prior to further modification.

I. Materials Required

Table 1 shows the different materials required for the purpose of the present disclosure.

TABLE 1

| Category | Component | Precursor used |
|---|---|---|
| Support | Gamma-Aluminium oxide | |
| Promoter Metal | tin | $SnCl_2$ |
| Active Metal | platinum | $H_2PtCl_6 \cdot 6H_2O$ |
| Non-metallic component | chlorine | 35-38% HCl solution |
| Silanizing agent | $SiO_2$ | tetraethylorthosilicate |

II. Impregnation of Promoter Metal on to the Support to Obtain a First Catalytic Precursor The first catalytic precursor was obtained by impregnation of the promoter metal on to the solid support. As represented in Table 1, the promoter metal chosen for the present disclosure was tin, wherein tin was impregnated on to the support gamma-aluminium oxide. The support used for the present disclosure had the following defined properties and was used for obtaining the reforming catalyst. The support had a surface area in the range of 225 $m^2/g$, a pore volume of 0.6 cc/gm and a sphere size of 1.8 mm. The support used also had a crushing strength of 4 daN, an attrition loss of 0.2% and LOI of 2.2. The support chosen also had a density of 0.6 g/cc and acidity in the range of 0.650 mmol/g.

In detail, the following steps were involved in obtaining the first catalytic precursor: 9.5 mg of tin chloride ($SnCl_2$) was dissolved in 40 ml of water followed by the addition of 35-38% conc. HCl solution and the pH of the solution was maintained at 2. This solution was then added to 5 mg of the support gamma-aluminium oxide and left for 1 hour at room temperature. The obtained solution containing tin chloride and the support gamma-aluminium oxide was kept under continuous stirring in the rotary evaporator for 1 hour at a temperature of about 60° C. and at a speed of 100 rpm. Then, the solvent (water) was evaporated by heating the solution under vacuum to a temperature of 60° C. followed by drying under vacuum for 30 minutes at a temperature of 60° C., so as to obtain the first catalytic precursor. It is also specified that the impregnation of promoter metal on to the support was done through sequential impregnation or co-impregnation mode.

III. Deposition of the Active Metal Component on to the First Catalytic Precursor (Promoter Metal Loaded Support) to Obtain a Second Catalytic Precursor The first catalytic precursor was then modified with the deposition of the active metal. The active metal of the present disclosure was platinum and the precursor used was $H_2PtCl_6$ solution. $H_2PtCl_6$ solution was prepared at a concentration of 10 mg/mL. 4 ml of $H_2PtCl_6$ solution from 10 mg/ml stock solution was then dissolved in 40 ml of water. This solution was then was added to the first catalytic precursor, i.e., tin loaded gamma-aluminium oxide support and was left for 1 hour at room temperature. The obtained solution containing platinum chloride and tin loaded gamma-aluminium oxide support was kept under continuous stirring in the rotary evaporator for 1 hour at a temperature of about 60° C. and at a speed in a range of 100 rpm. Then, the solvent (water) was evaporated by heating the solution under vacuum to a temperature of 60° C. and the second catalytic precursor was obtained. Further, the second catalytic precursor was dried under vacuum for 30 minutes at a temperature of 60° C. and further left for drying overnight at a temperature of 120° C. It is also specified that the deposition of promoter metal on the support was done through sequential impregnation or co-impregnation mode.

IV. Inclusion of Non-Metallic Component in the Second Catalytic Precursor to Obtain a Third Catalytic Precursor The non-metallic component (Chlorine) was included in the catalytic precursor by below said process. The precursor of the non-metallic component of the present disclosure was aqueous hydrogen chloride. 1190 μl of conc. HCl was diluted in 20 ml of water and was added to the second catalytic precursor containing tin and platinum-loaded gamma-aluminium oxide support. The solution was left at room temperature for 1 hour. The obtained solution containing aqueous HCl and the second catalytic precursor was kept under continuous stirring in the rotary evaporator for 1 hour at a temperature of about 60° C. and at a speed of 100 rpm. Then, the solvent (water) was evaporated by heating the solution under vacuum to a temperature of 60° C. and the third catalytic precursor was obtained. Further, the third catalytic precursor was dried under vacuum for 30 minutes at a temperature of 60° C. and further left for drying overnight at a temperature of 120° C. followed by calcination at 500° C. with a ramp rate of 1° C./min for 4 hours. The third catalytic precursor containing tin, platinum, chlorine impregnated gamma-aluminium oxide support was taken further for the silanization process.

V. Coating the Third Catalytic Precursor Using a Silanizing Agent

The third catalytic precursor as obtained above was then subjected to further silanization process. The silanizing agent chosen for the present process was tetraethyl orthosilicate (200 μl) in 30 ml of ethanol (resulting in an ethanolic tetraethyl orthosilicate solution). The ethanolic tetraethyl orthosilicate solution was added to the third catalytic precursor and was left at room temperature for 1 hour. The obtained solution containing tetraethyl orthosilicate and tin, platinum, chlorine impregnated gamma-aluminium oxide was kept under continuous stirring in the rotary evaporator for 1 hour at a temperature of about 25° C. and at a speed of 100 rpm. Then, the solvent (ethanol) was evaporated by heating the solution under vacuum to a temperature of 25° C., followed by drying under vacuum for 30 minutes at a temperature of 25° C. The obtained catalyst was left for drying overnight at a temperature of 120° C. to obtain the dried third catalytic precursor followed by calcination at 500° C. with a ramp rate of 1° C./min for 4 hours. After calcination, the reforming catalyst of the present disclosure was obtained.

Example 2

Reforming Catalyst Obtained by the Process of the Present Disclosure

The reforming catalyst obtained by the process as disclosed above was a bimetallic catalyst. The catalyst comprised of following elements: Gamma-Aluminium oxide (support) with a weight percentage of 97%, tin (promoter atom) with a weight percentage of 0.26%, platinum (active metal) with weight percentage of 0.26%, a layer of silica oxide having a weight percentage in a range of 1.4%. This catalyst can be used for continuous catalytic reforming/regeneration (CCR) process, hence, this catalyst can also be term as CCR catalyst.

Example 3

Effect of Coating of the Silanizing Agent on the Catalyst of the Present Disclosure The step of coating the catalyst (third catalytic precursor) with silanizing agent such as $SiO_2$ (1.4%) is the most crucial step of the present disclosure, and this step is also known as the silanization process. The following reactor and reforming catalyst parameters were maintained for all the catalysts as provided in the forthcoming examples: Reactor used was fixed bed reactor; weight of the catalyst was 2 gm; reduction conditions: $H_2$/HC mole ratio: 1.8, reduction temperature: 500° C., reduction ($H_2$) pressure: 7 bar; reaction conditions: WHSV: 2 h$^{-1}$, reaction pressure: 4.5 bar, reaction temperature: 500° C., $H_2$ flow rate: 24 mL/min.

For the purpose of checking the effect of the silica coating on the reforming catalyst of the present disclosure, hydrotreated heavy naphtha consisting majorly C7-C9 hydrocarbons distributed as naphthenes, paraffins, olefins, and aromatics were utilised. The feed having low RON naphthenes and paraffins were upgraded to high RON aromatics, through continuous catalytic reformatting process of dehydrogenation of naphthenes, and dehydrocylization of paraffins to high-value aromatics.

Table 2 shows the effect of the presence of silica coating on the catalyst.

TABLE 2

| | Feed | Catalyst without silica coating (Conventional catalyst) | Catalyst with silica coating (Present disclosure) |
|---|---|---|---|
| Naphthenes | 27.49 | 0.78 | 0.49 |
| i-Paraffins | 31.37 | 8.26 | 6.79 |
| n-Paraffins | 25.04 | 3.72 | 3.09 |
| Olefins | 1.70 | 1.37 | 0.68 |
| Aromatics | 13.99 | 86 | 88.66 |
| RON | 59.8 | 103 | 104.5 |
| Reformate yield | | 83 | 84 |

As shown in Table 2, the dehydrocylization of paraffins to high-value aromatics in catalyst without silica coating was difficult because of inadequate acidic sites. In contrast, the presence of silica coating on the catalyst enhanced the acidic characteristics of the solid Gamma-Aluminium oxide support by forming an interfacial crystalline layer at the junction of Gamma-Aluminium oxide and the silica formed through silanization process, wherein textural properties of the support such as pore size, pore-volume, surface area, crystallinity, crushing strength remained intact. Moreover, the enhanced acidic characteristics of the catalyst provided necessary active acidic sites that allowed a better conversion of paraffins into high-value aromatics.

FIG. 1 depicts the Temperature Programmed Desorption (TPD) profile of the catalysts without silica coating (as indicated with orange color) and with silica coating (as indicated with blue color). It can be observed from FIG. 1 that the acidity of the catalyst without silica coating was 0.653 mmol/g whereas the acidity of the catalyst with silica coating was 0.880 mmol/g. This clearly indicated that the catalyst with silica coating had higher acidic character thereby improving the efficiency of the catalyst in the catalytic reforming.

It can be concluded from Table 2 and FIG. 1, that the presence of silica coating on the catalyst is very important so as to enhance the acidity profile of the catalyst, and to increase the overall efficiency of the reforming catalyst.

Example 4

Effect of the Process on the Catalyst Performance

The above-said process (as explained in Example 1) for obtaining the reforming catalyst has a significant effect on the catalyst performance. The effect of each step involved in the process, on the catalyst performance is explained below, wherein the feeds used for the purpose of the present study were selected from the group consisting of naphthene (27.49%), isoparaffin (i-Par) (31.37%), normal paraffin (n-Par) (25.04%), olefins (1.70), aromatics (13.99%). The research octane number (RON) (calculated detailed hydrocarbon analysis (DHA)) was 59.8.

(a) Effect of Loading Metals (Tin and Platinum) and its Impact on Catalyst Performance Table 3 explains the effect of loading metals such as tin and platinum on the catalyst performance. The process described in Example 1 was repeated with a slight variation. The effect of sequential impregnation of metals, without calcination in each stage was evaluated in the catalyst 3a or NMPS_SUPP18_C1351; the effect of sequential impregnation of metals, with calcination in each stage was evaluated in the catalyst 3b or NMPS_SUPP18_C1352, and the effect of co-impregnation of metals followed by calcination was evaluated in the catalyst 3c or NMPS_SUPP18_C1353.

| Catalyst | Naphthenes | i-par | n-par | Olefins | Aromatics | RON | Liq. Yield | Benzene |
|---|---|---|---|---|---|---|---|---|
| 3a | 1.43 | 7.06 | 3.69 | 1.09 | 86.71 | 103.7 | 82 | 1.76 |
| 3b | 1.23 | 12.41 | 4.5 | 2.10 | 79.71 | 101.1 | 86 | 1.17 |
| 3c | 0.44 | 9.21 | 3.73 | 1.23 | 85.4 | 102.8 | 85 | 1.57 |

From Table 3, it can be observed that on the basis of the stability of catalyst and production of high-value aromatic content, the catalyst 3a or NMPS_SUPP18_C1351 was considered as the best catalyst. This indicated that the sequential impregnation of metals resulted in improved paraffin and naphthenes conversions to yield higher aromatics over other methods of synthesis.

(b) Inclusion of Non-Metallic Component-Sequence of Inclusion of Aq. HCl

The process for preparing reforming catalyst comprised of inclusion of non-metallic components on to the metal loaded support following the process details described in Example 1 with slight variation. The sequence of inclusion of the non-metallic component was studied and the catalyst performance was evaluated. The non-metallic component chosen was aq. HCl was added in three different sequences in the preparation process. Table 4 depicts the addition of aq. HCl prior to the impregnation of metals on the catalyst 4a or NMPS_SUPP18_C135_Pre; addition of aq. HCl during/along with the impregnation of metals on the catalyst 4b or NMPS_SUPP18_C135_During; addition of aq. HCl after impregnation of metals on the catalyst 4c or NMPS_SUPP18_C135_Post.

TABLE 4

| Catalyst | Naphthenes | i-par | n-par | Olefins | Aromatics | RON | Liq. Yield |
|---|---|---|---|---|---|---|---|
| 4a | 3.5 | 19.7 | 9.41 | 3.2 | 64.2 | 96.5 | 85 |
| 4b | 3.5 | 15.53 | 7.71 | 0.73 | 72.49 | 99.4 | 83 |
| 4c | 1.43 | 7.06 | 3.69 | 1.09 | 86.71 | 103.7 | 82 |

It can be inferred from Table 4 that 4c had higher RON value with better aromatic yields. This indicated that the non-metallic component should be included after the metal impregnation on to the support. This process provided necessary active acidic sites as well as achieved better metal dispersion. Consequently, it resulted in improved paraffin and naphthenes conversions to yield higher aromatics over other methods of synthesis. Henceforth, the catalyst 4c was considered as the best catalyst.

(c) Inclusion of Non-Metallic Component-Sequence of Oxychlorination

In the examples defined above, the non-metallic inclusion was carried out by adding aq. HCl. In another example, oxychlorination was done prior to metal loading on the catalyst 5a or NMPS_SUPP18_OCl_Pre and after the metal loading on the catalyst 5b or NMPS_SUPP18_OCl_Post.

TABLE 5

| Catalyst | Naphthenes | i-par | n-par | Olefins | Aromatics | RON | Liq. Yield |
|---|---|---|---|---|---|---|---|
| 5a | 0.51 | 8.67 | 3.75 | 1.23 | 85.82 | 103.6 | 84 |
| 5b | 4.75 | 15.55 | 8.57 | 2.47 | 68.64 | 98.1 | 87 |

From Table 5 it can be observed that the catalyst obtained by oxychlorination prior to metal loading resulted in the product of RON value of 103.1, a liquid yield of 84. This shows that Cl incorporation through oxychlorination should be prior to metal loading to provide necessary acidity and metal dispersion for a better catalyst performance (d) Effect of Addition of Transition and Rare-Earth Metals and Other Elements on Catalyst Performance The reforming catalyst of the present disclosure further comprised other transition, rare earth metals, and non-metals. Particularly, the reforming catalyst was obtained by incorporating metals such as cerium (Ce), zirconium (Zr), molybdenum (Mo), tungsten (W), phosphorus (P) prior to the loading of tin (promoter metal) on the support. For instance, catalyst of 6a or NMPS_SUPP18_C135 comprised tin, platinum and chlorine loaded on to the support, whereas catalyst of 6b or NMPS_SUPP18_C135_Ce comprised cerium, catalyst of 6c or NMPS_SUPP18_C135_Zr comprised zirconium, catalyst of 6d or NMPS_SUPP18_C135_Mo comprised molybdenum, catalyst of 6e or NMPS_SUPP18_C135_W comprised tungsten, catalyst of 6f or NMPS_SUPP18_C135_P comprised phosphorus, in addition to tin, platinum and chlorine loaded support.

TABLE 6

| Catalyst | Naphthenes | i-par | n-par | Olefins | Aromatics | RON | Liq. T Yield | Benzene |
|---|---|---|---|---|---|---|---|---|
| 6a | 1.43 | 7.06 | 3.69 | 1.09 | 86.71 | 103.7 | 82 | 1.76 |
| 6b | 5.49 | 15.79 | 8.1 | 2.67 | 68 | 97.63 | 87 | 1.1 |
| 6c | 1.58 | 19.23 | 6.26 | 0.22 | 73 |  | 86 | 0.9 |
| 6d | 2.28 | 16.71 | 7.1 | 0.69 | 73.2 | 99.13 | 83 | 1 |
| 6e | 1 | 18.6 | 6.99 | 0.93 | 72.01 | 99.4 | 83 | 2.13 |
| 6f | 0.96 | 9.4 | 4.02 | 1.41 | 84.2 | 102.8 | 83 | 1.46 |

It can be deduced from Table 6 that the addition of rare earth and other elements did not improve the catalyst performance Ce and Zr were impregnated on the catalyst from their nitrate salts, heptamolybdate and tungstate salts were used for impregnating Mo and W on the catalysts, whereas phosphoric acid was used for impregnating P on the catalysts. The rare earth and other elements were maintained at a weight percentage of 0.3% in the final catalyst. On the basis of higher RON values, and improved paraffin and naphthenes conversions to yield higher aromatics, the catalyst 6a or NMPS_SUPP18_C135 (without any rare earth and other elements) was found to be a better catalyst.

(e) Effect of the Mole Ratio of Tin/Platinum (Sn/Pt) on Catalyst Performance

To obtain the reforming catalyst of higher catalytic performance the process as described in Example 1 was followed, the mole ratio of Sn/Pt is critical so as to obtain the reforming catalyst with high catalytic performance. Table 7 explains the effect of Sn/Pt on the catalyst performance Specifically, tin (promoter metal) and platinum (active metal) were taken in the ratio of 1.6:1 and 1:1 for catalyst 7a or NMPS_SUPP18_C135 and 7b or NMPS_SUPP18_C135, respectively.

TABLE 7

| Catalyst | Naphthenes | i-par | n-par | Olefins | Aromatics | RON | Liq. Yield | Benzene |
|---|---|---|---|---|---|---|---|---|
| 7a (Sn/Pt = 1.6) | 1.43 | 7.06 | 3.69 | 1.09 | 86.71 | 103.7 | 82 | 1.76 |
| 7b (Sn/Pt = 1.0) | 0.78 | 8.26 | 3.72 | 1.37 | 86 | 103 | 83 | 1.33 |

Table 7 showed that the presence of Sn to PT (in catalyst 7b) in a mole ratio of 1:1 resulted in the product with RON value of 103, liquid yield 83 and benzene 1.33 whereas the presence of Sn to PT (in catalyst 7a) in a weight of 1.6:1 resulted in obtaining a product of RON value 103, liquid yield 82 and benzene 1.76.

Therefore, it can be inferred from Table 7 that Sn/Pt maintained at lower mole ratios i.e. 1 over 1.6 provided better results. The weight percentage of 0.26 in both the catalysts 7a and 7b, whereas the weight percentage of Sn was varied to maintain the respective mole ratios.

(f) Effect of $SiO_2$ on Catalyst Performance

For the purpose of the present disclosure, a silanizing agent was used for silica coating. The reforming catalyst obtained with silica coating was 8b or NMPS_SUPP18_C135 and catalyst without silica coating was 8a or NMPS_SUPP18_C135 as shown in Table 8. The catalytic cracking process was then carried out using the reforming catalysts 8a & 8b and the product obtained is tabulated below.

TABLE 8

| Catalyst | Naphthenes | i-par | n-par | Olefins | Aromatics | RON | Liq. Yield | Benzene |
|---|---|---|---|---|---|---|---|---|
| 8a (without silica) | 0.78 | 8.26 | 3.72 | 1.37 | 86 | 103 | 83 | 1.33 |
| 8b (with silica) | 0.49 | 6.79 | 3.09 | 0.68 | 88.66 | 104.5 | 84 | 1.54 |

From Table 8, it can be inferred that the silica-coated catalyst resulted in obtaining the product of RON value of 104.5, a liquid yield of 84 and benzene value of 1.54. On the other hand, the catalyst without silica coating resulted in the product of RON value of 103, a liquid yield of 83 and benzene value of 1.33. RON value was higher for the product catalyzed by the catalyst 7b as compared to the product catalyzed by catalyst 7a. This clearly indicated that the silica-coated catalyst had a better conversion performance of converting low octane liquid products into high-octane liquid products in comparison to the catalyst without silica coating.

Moreover, the metallic function plays an important role in dehydrogenation of naphthenes and dehydrogenation of paraffins for further cyclization. Stable conversions in case of the catalyst with silica, i.e., 8b over the catalyst without silica, i.e., 8a clearly indicated the metallic function was protected from sintering behavior. Hence, from Table 8, it can be inferred that silica-coated catalyst resulted in improving sinter resistance behavior.

Advantages of the Present Disclosure

The present disclosure provides a process for preparing the reforming catalyst, said process comprising: impregnating at least one support with at least one promoter metal and at least one active metallic component to obtain a second catalytic precursor; contacting the second catalytic precursor with at least one non-metallic component to obtain a third catalytic precursor; coating the third catalytic precursor with at least one silanizing agent to obtain a coated third catalytic precursor; and drying the coated third catalytic precursor to obtain a dried third catalytic precursor followed by calcination of the dried third catalytic precursor to obtain the reforming catalyst. The sequence of addition of each component on to the support is essential in obtaining the reforming catalyst of desired characteristics. The process of the present disclosure helps to enhance the catalytic performance of the catalyst. Also, the silanization process enabled the catalytic performance by protecting the metals from agglomeration during the high-temperature reforming reactions. And the process helps in improving the acidic characteristics of the support. Thus, the availability of more of metal sites and the acidic character of the support provides a sustaining catalytic activity in the conversion process. The present disclosure also provides the reforming catalyst with high catalytic activity. Overall, the present disclosure provides process for obtaining improved reforming catalyst formulation.

We claim:

1. A process for preparing a reforming catalyst, the process consisting of:
   first, impregnating at least one support with at least one promoter metal and at least one active metallic component to obtain a second catalytic precursor;
   second, contacting the second catalytic precursor with aqueous HCl to obtain a third catalytic precursor;
   third, coating the third catalytic precursor with tetraethyl orthosilicate at a temperature in a range of 20-35° C. to obtain a coated third catalytic precursor, wherein coating with tetraethyl orthosilicate improves an acidic character of the at least one support and improves a sinter resistance behavior of the at least one active metallic component; and
   fourth, drying the coated third catalytic precursor to obtain a dried third catalytic precursor followed by calcination of the dried third catalytic precursor for a time period in a range of 3-7 hours at a temperature in a range of 400-600° C. to obtain the reforming catalyst.

2. The process as claimed in claim 1, wherein the at least one support is selected from the group consisting of alpha-aluminium oxide, beta-aluminium oxide, gamma-aluminium oxide, delta-aluminium oxide, theta-aluminium oxide, $SiO_2$, silica-alumina (SIRALs), titania, zirconia, zinc oxide, composites of alumina and zeolites, spinel structures, and combinations thereof, and is co-impregnated or sequentially impregnated with the at least one promoter metal and the at least one active metallic component.

3. The process as claimed in claim 1, wherein impregnating the at least one support is done with an aqueous solution comprising the at least one promoter metal to obtain a first catalytic precursor, and
   depositing an aqueous solution comprising the at least one active metallic component on the first catalytic precursor to obtain the second catalytic precursor.

4. The process as claimed in claim 1, wherein the at least one promoter metal is selected from the group consisting of tin, rhenium, germanium, iridium, thallium, lead, indium, and combinations thereof and the at least one active metallic component is selected from the group consisting of platinum, palladium, ruthenium, rhodium, osmium, iridium, and combinations thereof.

5. The process as claimed in claim 1, wherein the at least one support has a porosity in a range of 2-20 nm.

6. The process as claimed in claim 3, wherein impregnating the at least one support comprises:
   contacting the aqueous solution comprising the at least one promoter metal to the at least one support is carried out at a pH in a range of 1-4 for a time period in a range of 40-120 minutes at a temperature in a range of 40-60° C. at a speed in a range of 100-150 rpm, followed by drying at a temperature in a range of 40-120° C., under a pressure in a range of 30-200 mbar for a time period 20-90 minutes to obtain the first catalytic precursor.

7. The process as claimed in claim 3, wherein depositing the aqueous solution comprising the at least one active metallic component on the first catalytic precursor comprises:
   contacting the aqueous solution comprising the at least one active metallic component to the first catalytic precursor for a time period in a range of 40-120 minutes at a temperature in a range of 40-60° C. at a speed in a range of 100-150 rpm, followed by drying at a temperature in a range of 40-120° C., under a pressure in a range of 30-200 mbar for a time period 20-90 minutes to obtain the second catalytic precursor.

8. The process as claimed in claim 1, wherein contacting the second catalytic precursor with aqueous HCl is carried out at a temperature in a range of 40-60° C. and under a pressure in a range of 30-200 mbar followed by drying at a temperature in a range of 60-120° C. for a time period in a range of 10-20 hours to obtain the third catalytic precursor.

9. The process as claimed in claim 1, wherein contacting the second catalytic precursor with aqueous HCl is carried out at a temperature in a range of 450-600° C. for a time period in a range of 1-8 hours followed by drying at a temperature in a range of 60-120° C. for a time period in a range of 10-20 hours to obtain the third catalytic precursor.

10. The process as claimed in claim 1, wherein contacting the third catalytic precursor with tetraethyl orthosilicate is carried out at a temperature in a range of 20-35° C. under a pressure in a range of 30-200 mbar for a time period in a range of 20-130 minutes to obtain the coated third catalytic precursor.

11. The process as claimed in claim 1, wherein drying of the coated third catalytic precursor is carried out at a temperature in a range of 100-130° C. to obtain the dried third catalytic precursor followed by calcination of the dried third catalytic precursor to obtain the reforming catalyst.

12. A reforming catalyst prepared from the process as claimed in claim 1.

* * * * *